(12) United States Patent
Leng et al.

(10) Patent No.: US 10,144,309 B2
(45) Date of Patent: Dec. 4, 2018

(54) DUAL MOTOR POWER SYSTEM AND CONTROL METHOD FOR PURE ELECTRIC VEHICLE

(71) Applicant: SAIC Motor Corporation Limited, Shanghai (CN)

(72) Inventors: Hongxiang Leng, Shanghai (CN); Wen Li, Shanghai (CN); Jun Sun, Shanghai (CN); Xinhua Jiang, Shanghai (CN); Feifei Zhang, Shanghai (CN); Sidong Luo, Shanghai (CN); Hailong Ge, Shanghai (CN)

(73) Assignee: SAIC Motor Corporation Limited, Shanghai (CN)

( * ) Notice: Subject to any disclaimer, the term of this patent is extended or adjusted under 35 U.S.C. 154(b) by 415 days.

(21) Appl. No.: 14/947,979

(22) Filed: Nov. 20, 2015

(65) Prior Publication Data

US 2016/0347203 A1 Dec. 1, 2016

(30) Foreign Application Priority Data

May 29, 2015 (CN) .......................... 2015 1 0288463

(51) Int. Cl.
*B60L 15/20* (2006.01)
*B60L 11/18* (2006.01)
(Continued)

(52) U.S. Cl.
CPC ............ *B60L 15/2045* (2013.01); *B60K 1/02* (2013.01); *B60L 11/18* (2013.01); *B60L 15/2054* (2013.01);
(Continued)

(58) Field of Classification Search
CPC .. B60L 15/2045; B60L 15/2054; B60L 11/18; B60L 2220/42; H02P 5/747
See application file for complete search history.

(56) References Cited

U.S. PATENT DOCUMENTS 4,584,892 A 4/1986 Hiraiwa et al.
5,106,352 A 4/1992 Lepelletier
(Continued)

FOREIGN PATENT DOCUMENTS

CN 101875298 A 11/2010
CN 102490585 A 6/2012
(Continued)

OTHER PUBLICATIONS

U.S. Appl. No. 14/948,034, filed Nov. 20, 2015, inventors: Jun Zhu, Chengjie Ma, Zhengmin Gu, Xiajun Ye, Pengjun Zhang, Peng Zhang, and Jing Gu.
(Continued)

*Primary Examiner* — Jelani A Smith
*Assistant Examiner* — Donald J Wallace
(74) *Attorney, Agent, or Firm* — McDonnell Boehnen Hulbert & Berghoff LLP (57) ABSTRACT

A dual motor power system for a pure electric vehicle and a control method thereof are disclosed, wherein within a range defined between upper and lower torque thresholds for the operations of one of the two motors under current vehicle speed, the torque of this motor is changed stepwise with a certain torque step; the required torque of the other motor is determined based on the torque distribution relation of the first and second motors; and the synchronized efficiency of the power system is determined based on the torques of the first and second motors so that the optimal synchronized efficiency of the power system is ergodically searched out, and the optimal working points of the two motors and the corresponding gear of the second motor are determined then.

12 Claims, 3 Drawing Sheets

(51) Int. Cl.
  *B60K 1/02* (2006.01)
  *H02P 5/747* (2006.01)
(52) U.S. Cl.
  CPC ............ *H02P 5/747* (2013.01); *B60L 2220/42* (2013.01); *Y02T 10/7258* (2013.01)

(56) References Cited

U.S. PATENT DOCUMENTS

| | | |
|---|---|---|
| 5,425,283 A | 6/1995 | Wehking |
| 5,558,595 A | 9/1996 | Schmidt et al. |
| 5,789,823 A | 8/1998 | Sherman |
| 6,019,697 A | 2/2000 | Colletti |
| 6,592,484 B1 | 7/2003 | Tsai et al. |
| 6,886,424 B2 | 5/2005 | Janson et al. |
| 7,597,020 B2 | 10/2009 | Baldwin |
| 7,611,433 B2 | 11/2009 | Forsyth et al. |
| 7,895,910 B2 | 3/2011 | Caenazzo et al. |
| 8,109,167 B2 | 2/2012 | Mohlin et al. |
| 8,333,126 B2 | 12/2012 | Enstroem et al. |
| 8,444,519 B2 | 5/2013 | Borntraeger et al. |
| 8,549,959 B2 | 10/2013 | Kasuya et al. |
| 8,672,109 B2 | 3/2014 | Quartier et al. |
| 8,672,803 B2 | 3/2014 | Tamba et al. |
| 8,677,847 B2 | 3/2014 | Diani et al. |
| 8,689,655 B2 | 4/2014 | Diani et al. |
| 8,714,287 B2 | 5/2014 | Kim et al. |
| 8,727,939 B2 | 5/2014 | Chen et al. |
| 8,763,485 B2 | 7/2014 | Thomas |
| 8,771,136 B2 | 7/2014 | Miller et al. |
| 8,784,249 B2 | 7/2014 | Motodohi et al. |
| 2001/0051556 A1 | 12/2001 | Takenaka |
| 2004/0251064 A1 | 12/2004 | Imai |
| 2004/0251862 A1 | 12/2004 | Imai |
| 2009/0118914 A1 | 5/2009 | Schwenke et al. |
| 2009/0199666 A1 | 8/2009 | Yang et al. |
| 2010/0276218 A1 | 11/2010 | Thompson et al. |
| 2010/0311540 A1 | 12/2010 | Hellenbroich |
| 2011/0239820 A1 | 10/2011 | Shibahata |
| 2012/0104904 A1 | 5/2012 | Abiko et al. |
| 2013/0035203 A1 | 2/2013 | Arakawa et al. |
| 2013/0184111 A1 | 7/2013 | Tsuchida et al. |
| 2014/0011631 A1 | 1/2014 | Cimatti |
| 2016/0009269 A1 | 1/2016 | Zhou et al. |
| 2016/0075257 A1 | 3/2016 | Wein et al. |
| 2016/0137045 A1 | 5/2016 | Zhu et al. |
| 2016/0137048 A1 | 5/2016 | Zhu et al. |
| 2016/0137049 A1 | 5/2016 | Zhu et al. |
| 2016/0137188 A1 | 5/2016 | Zhu et al. |
| 2016/0137189 A1 | 5/2016 | Zhu et al. |
| 2016/0200210 A1 | 7/2016 | Burow et al. |
| 2016/0368482 A1* | 12/2016 | Shahverdi ........... B60W 30/188 |

FOREIGN PATENT DOCUMENTS

| | | |
|---|---|---|
| CN | 103072474 A | 5/2013 |
| CN | 103332100 A | 10/2013 |
| CN | 103552461 A | 2/2014 |
| DE | 102012204717 A1 | 9/2013 |
| DE | 102013007354 A1 | 10/2014 |
| DE | 102013013953 A1 | 2/2015 |
| EP | 1690723 A2 | 8/2006 |
| EP | 2676831 A1 | 12/2013 |
| JP | 2009107626 A | 5/2009 |
| WO | 2008/138387 A1 | 11/2008 |

OTHER PUBLICATIONS

Ioan-Adrian Viorel; et al.; Integrated Starter-Generators for Automotive Applications, ACTA Electrotehnica, vol. 45, No. 3, Sep. 2004, pp. 255-260.
Nate Martinez, Motor Trend Canada, First Drive: 2012 Infiniti M35 Hybrid—Fashionably Late: Infinity Finally RSVPs for Upscale Hybrid Party, Aug. 4, 2010, 18 pages.
Iskra Avtoelektrika d.d.; Integrated Starter Motor Generators; Mar. 2008, 8 pages.
European Search Report, Application No. 15196911.0-1752, dated Oct. 10, 2016.

\* cited by examiner

DUAL MOTOR POWER SYSTEM AND CONTROL METHOD FOR PURE ELECTRIC VEHICLE

TECHNICAL FIELD

The disclosure relates to a dual motor power system and a control method for a pure electric vehicle (or battery electric vehicle).

BACKGROUND ART

In current pure electric vehicles, a single electric motor, in combination with a transmission power system having one or two gears or other numbers of gears, is generally used for vehicle driving. The dynamic performance of a pure electric vehicle is directly limited by the peak torque and power characteristic of the single electric motor. The one gear transmission system has only one speed ratio, and thus cannot provide a large room for economic optimization; on the other hand, it is possible to optimize the dynamic performance and economics of the two-gear transmission system, but power interruption may occur which affects the driving comfort.

In addition, pure electric vehicles driven by dual motors now get more and more attention for the reasons that higher power output and more flexible control strategy can be provided and gear switching without power interruption can be achieved, and economic optimization techniques for the pure electric vehicles have been proposed. In these techniques, the gears of the motors are only selected based on the vehicle speed and the pressed degree of the acceleration pedal, and the torque distribution of the two motors is determined based on the selected gears of the motors, so it is not easy to obtain optimized economics.

SUMMARY OF THE DISCLOSURE

In view of state of the prior art, an object of the disclosure is to provide a control strategy for a pure electric vehicle driven by dual motors, by means of which optimal working points of the dual motors can be found.

In order to achieve this object, according to one aspect of the disclosure, there provides a dual motor power system for a pure electric vehicle, which comprises:
first and second motors;
a transmission coupled with the first and second motors in a manner that the first motor is able to output power with a single gear ratio and the second motor is able to output power with two gear ratios, the transmission comprising a single synchronizer for controlling the gear of the second motor; and
a control system configured to determine the torque distribution between the first and second motors and the engaging position of the synchronizer and to control the operations of the first and second motors and the synchronizer;
wherein the control system determines the torque distribution between the first and second motors and the engaging position of the synchronizer by the steps of:
(1) a step of establishing the torque distribution relation of the first and second motors, wherein the required torque of vehicle at wheel, the required torque of the two motors at wheel, the transmission path efficiency for the two motors and the gear of the second motor are all involved;
(2) a step of establishing the relation between the synchronized efficiency of the power system and the working points of the two motors, each working point being expressed by a torque and a speed;
(3) an optimization step in which the following concrete ergodic optimization actions are taken, with the synchronized efficiency of the power system as the optimization objective and with the torque distribution of the first and second motors and the gear of the second motor as the parameters to be optimized:
within a range defined between upper and lower torque thresholds for the operations of one of the two motors under current vehicle speed, the torque of this motor is changed stepwise with a certain torque step;
the required torque of the other motor is determined based on the torque distribution relation of the first and second motors; and
the synchronized efficiency of the power system is determined based on the torques of the first and second motors so that the optimal synchronized efficiency of the power system is ergodically searched out, and the optimal working points of the two motors and the corresponding gear of the second motor are determined then.

According to a possible embodiment of the disclosure, under a certain torque of the one of the two motors, the corresponding working point is abandoned if the required torque of the other motor falls beyond its upper and lower torque thresholds.

According to a possible embodiment of the disclosure, the electrically driving peak torque and the electricity generation peak torque of the first and second motors, which are functions of motor speed, are regarded as the upper and lower torque thresholds for the operations of the first and second motors, and in the optimization step, the torque of the one of the two motors is changed with a certain torque step from the motor driving peak torque or the electricity generation peak torque of this motor, until the torque reaches the electricity generation peak torque or the motor driving peak torque.

According to a possible embodiment of the disclosure, the first one of the two motors acts as a main motor which provides driving power continuously during the running of the vehicle, and the second one of the two motors acts as an assistant motor which provides assistant or individual driving when the required vehicle torque or power is high or the first motor has a low efficiency now; and in the optimization step, the torque of the first motor is changed with a certain torque step within a range of the upper and lower torque thresholds for the operation of the first motor under current vehicle speed to perform the ergodic optimization.

According to a possible embodiment of the disclosure, when the power of the first motor is zero, the power loss in the operation of the second motor caused by dragging the first motor to rotate is involved in the synchronized system efficiency.

According to a possible embodiment of the disclosure, in the step of establishing the relation between the synchronized efficiency of the power system and the working points of the two motors, the electrically driving efficiency of each motor when it is used as an electric motor and the electricity generation efficiency of each motor when it is used as an electricity generator are involved.

According to a possible embodiment of the disclosure, in the optimization step, limitations on the electric current and power of the vehicle battery are involved, and if the combined working points of the two motors results in the vehicle battery current or power falling beyond the limitations, the combined working points are abandoned.

According to a possible embodiment of the disclosure, in the optimization step, the torque step is adjusted for the purpose of increasing the calculation speed and/or the calculation precision.

According to a possible embodiment of the disclosure, the step of establishing the relation between the synchronized efficiency of the power system and the working points of the two motors comprises calculating and storing previously an offline interpolation table, by means of which, the optimal working points of the two motors and the corresponding gear of the second motor are determined in the optimization step.

The disclosure in another aspect provides a control method used in the dual motor power system for a pure electric vehicle as described above, the steps described above being carried out in this method. Various features described above for the dual motor power system are also applicable in the control method of the disclosure.

According to a possible embodiment of the disclosure, the optimization step concretely comprises the following substeps carried out in sequence:

Step S1, start;

Step S2, the value of the torque of the one of the first and second motors is set to be equal to one of the upper and lower torque thresholds, and the power system efficiency and the serial number of the working point under search are all set to be zero;

Step S3, from the one of the upper and lower torque thresholds, the value of the torque of the one of the first and second motors is changed with a certain torque step, based on which value, the value of the torque of the other of the first and second motors is calculated, and then current power system efficiency is calculated based on the values of the torques of the first and second motors;

Step S4, judging whether the calculated current power system efficiency is higher than the former power system efficiency; goes to Step S5 if the result is "Yes", and goes to Step S6 if the result is "No";

Step S5, the working points of the first and second motors, the gear of the second motor and the power system efficiency are updated to be their current values;

Step S6, the serial number of the working point under search is increased by one;

Step S7, judging whether the value of the torque of the one of the first and second motors reaches the other of the upper and lower torque thresholds; goes to Step S8 if the result is "Yes", and goes to Step S3 if the result is "No";

Step S8, keeping current values of the working points of the first and second motors, the gear of the second motor and the power system efficiency;

Step S9, performing realtime control to the first and second motors and the synchronizer based on current values of the working points of the first and second motors, the gear of the second motor and the power system efficiency.

According to the control strategy for the pure electric vehicle dual motor of the disclosure, the torque distribution of the two motors in their driving operations is optimized, and thus the economics in the driving of the vehicle is improved.

DETAILED DESCRIPTION OF PREFERRED EMBODIMENTS

Some possible embodiments of the disclosure will be described now.

Figure 1:
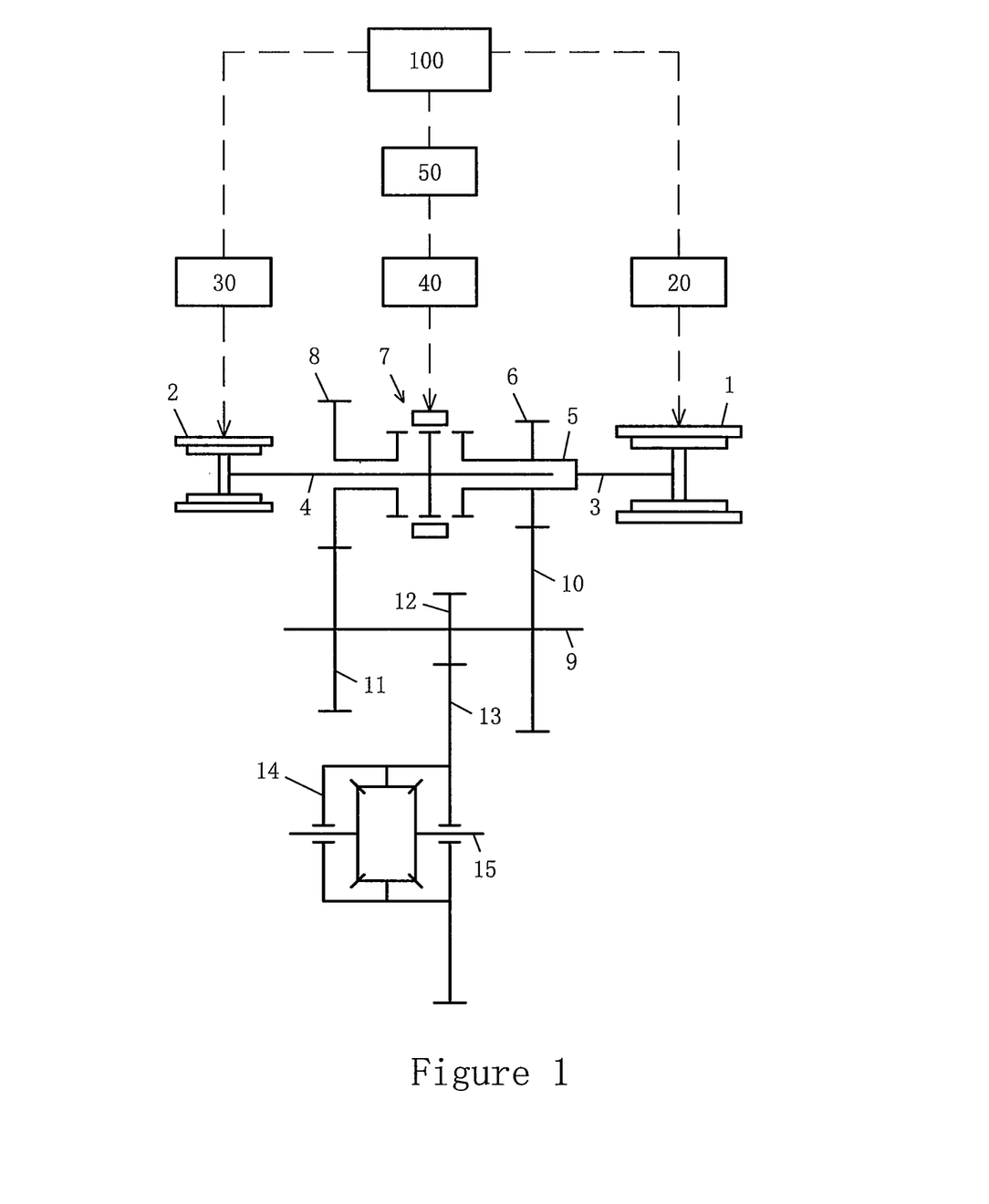
FIG. 1 shows a schematic structure of a dual motor power system for a pure electric vehicle according to an embodiment of the disclosure.
Figure 2:
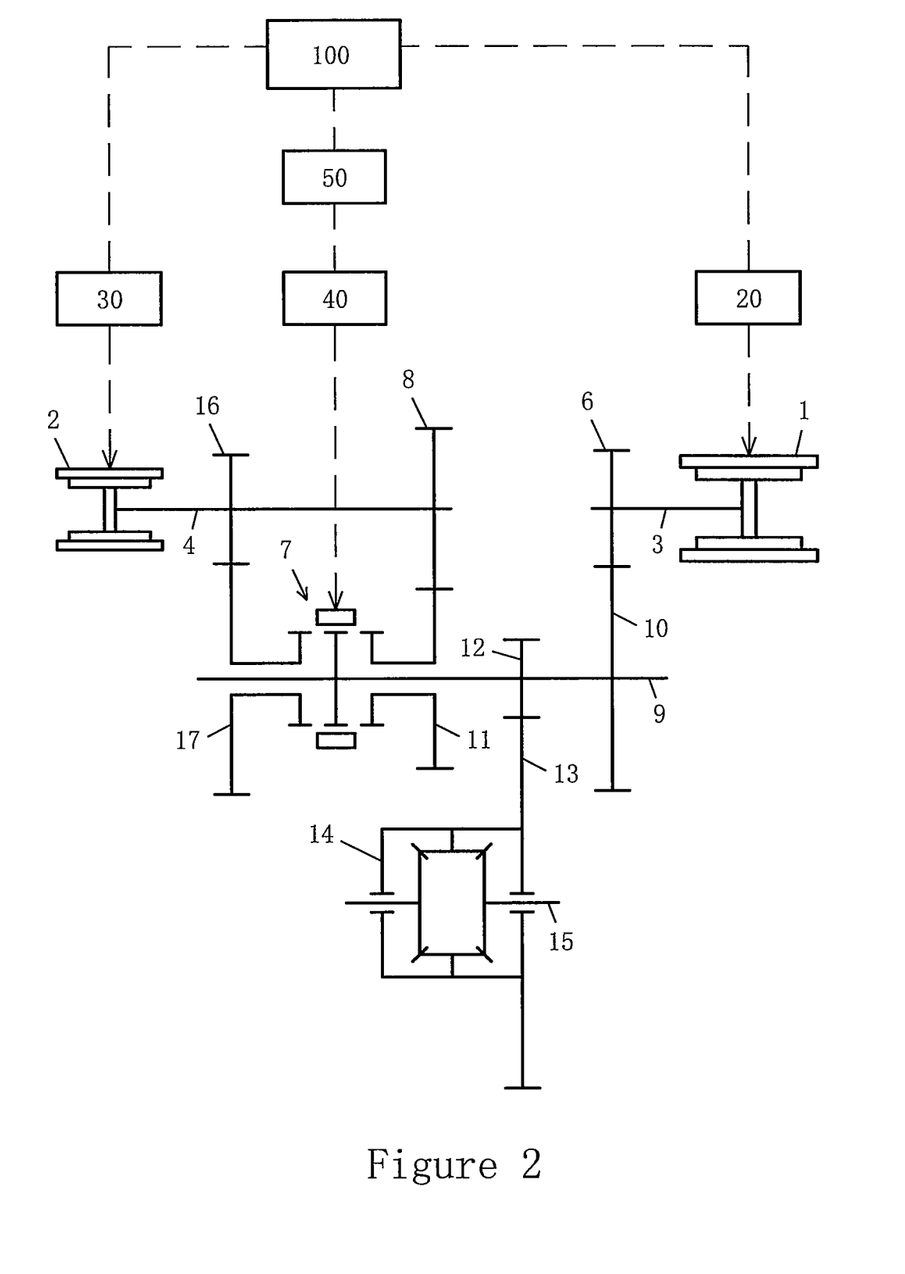
FIG. 2 shows a schematic structure of a dual motor power system for a pure electric vehicle according to another embodiment of the disclosure.

The disclosure relates to a power system and a corresponding control strategy for a pure electric vehicle driven by dual motors, one motor of this power system outputting power via a single gear transmission path while the other motor outputting power via a dual gear transmission path. FIGS. 1 and 2 show two embodiments of such a power system; however, it can be understood that the concept of the disclosure is also applicable in other type of dual motor power systems for a pure electric vehicle which meet the power outputting condition described above.

In the first embodiment shown in FIG. 1, a dual motor power system for a pure electric vehicle comprises a first motor 1 and a second motor 2, which are disposed opposing to each other. The first motor 1 drives a first-motor driving shaft 3 to rotate, and the second motor 2 drives a second-motor driving shaft 4 to rotate.

A transmission sleeve 5 is fixed to the first-motor driving shaft 3, a first-motor drive gearwheel 6 (also a second-motor first-gear drive gearwheel) is mounted on the transmission sleeve 5, and the second-motor driving shaft 4 is inserted into the transmission sleeve 5 and is rotatably carried by the transmission sleeve 5. A synchronizer 7 and a second-motor second-gear drive gearwheel 8 are mounted on the second-motor driving shaft 4. The synchronizer 7 is disposed axially between the first-motor drive gearwheel 6 and the second-motor second-gear drive gearwheel 8, and comprises an engaging ring which is selectively shiftable in an axial direction to engage with one of the two gearwheels. The synchronizer 7 is the only synchronizer used in the dual motor power system of the disclosure, for achieving the switching of the transmission paths of the dual motor power system.

The dual motor power system further comprises an intermediate shaft 9 on which a first-motor driven gearwheel 10 (also a second-motor first-gear driven gearwheel) and a second-motor second-gear driven gearwheel 11 are mounted, the two gearwheels being meshed with the first-motor drive gearwheel 6 and the second-motor second-gear drive gearwheel 8 respectively. A single transmission ratio or gear ratio for the first motor 1, which is also a first transmission ratio or gear ratio for the second motor 2, is provided between the first-motor drive gearwheel 6 and the first-motor driven gearwheel 10, and a second transmission ratio or gear ratio for the second motor 2 is provided between the second-motor second-gear drive gearwheel 8 and the second-motor second-gear driven gearwheel 11.

In addition, an output drive gearwheel 12 is mounted on the intermediate shaft 9. The output drive gearwheel 12 is meshed with an output driven gearwheel 13. The output driven gearwheel 13 forms an input end of a differential 14, and an output end of the differential 14 is formed by differential output shafts 15 which are arranged for driving corresponding driving wheels of the vehicle.

The above described configuration, from the first-motor driving shaft 3 and the second-motor driving shaft 4 to the output drive gearwheel 12, forms a transmission of the dual motor power system according to the first embodiment. In this transmission, the first motor 1 outputs power via a single power output path having a single transmission ratio, and the second motor 2 can output power via two power output paths having two gears. The second motor 2 in the first gear shares the same power output path with the first motor 1, and thus the first transmission ratio for the second motor 2 is the same as the single transmission ratio for the first motor 1. The second motor 2 in the second gear has a second transmission ratio which is different from the single transmission ratio or the first transmission ratio.

In the second embodiment shown in FIG. 2, a dual motor power system for a pure electric vehicle comprises a first motor 1 and a second motor 2. The first motor 1 drives the first-motor driving shaft 3 to rotate, and the second motor 2 drives the second-motor driving shaft 4 to rotate.

A first-motor drive gearwheel 6 is mounted on the first-motor driving shaft 3, and a second-motor first-gear drive gearwheel 16 and a second-motor second-gear drive gearwheel 8 are mounted on the second-motor driving shaft 4.

The dual motor power system further comprises an intermediate shaft 9 on which a first-motor driven gearwheel 10, a second-motor first-gear driven gearwheel 17 and a second-motor second-gear driven gearwheel 11 are mounted, the three gearwheels being meshed with the first-motor drive gearwheel 6, the second-motor first-gear drive gearwheel 16 and the second-motor second-gear drive gearwheel 8 respectively.

A synchronizer 7 is mounted on the intermediate shaft 9 and comprises an engaging ring which is selectively shiftable in an axial direction to engage with one of the second-motor first-gear driven gearwheel 17 and the second-motor second-gear driven gearwheel 11. The synchronizer 7 is the only synchronizer used in the dual motor power system of the disclosure, for achieving the switching of the transmission paths of the dual motor power system. It can be understood that the synchronizer 7 may alternatively be mounted on the second-motor driving shaft 4 such that its engaging ring can be selectively engaged with the second-motor first-gear drive gearwheel 16 or the second-motor second-gear drive gearwheel 8.

A single transmission ratio for the first motor 1 is provided between the first-motor drive gearwheel 6 and the first-motor driven gearwheel 10, a first transmission ratio for the second motor 2 is provided between the second-motor first-gear drive gearwheel 16 and the second-motor first-gear driven gearwheel 17, and a second transmission ratio for the second motor 2 is provided between the second-motor second-gear drive gearwheel 8 and the second-motor second-gear driven gearwheel 11.

Further, an output drive gearwheel 12 is mounted to the intermediate shaft 9. The output drive gearwheel 12 is meshed with an output driven gearwheel 13 which forms an input end of the differential 14, and output shafts 15 of the differential 14 are arranged for driving corresponding driving wheels of the vehicle.

The above described configuration, from the first-motor driving shaft 3 and the second-motor driving shaft 4 to the output drive gearwheel 12, forms a transmission of the dual motor power system according to the second embodiment. In this transmission, the first motor 1 outputs power via a single power output path having a single transmission ratio, and the second motor 2 can output power via two power output paths having two gears of the first and second transmission ratios which are different from each other. The first transmission ratio of the second motor 2 may be different from the single transmission ratio of the first motor 1.

With respect to the first embodiment, the dual motor power system of the second embodiment has a relative more complex structure and a higher cost, but can provide more combination patterns of transmission ratios, and thus has a larger room for optimizing the transmission ratios.

In addition, the dual motor power systems according to the first and second embodiments each further comprise a control system for controlling the transmission, the control system comprising a first motor controller 20 for controlling the operation of the first motor 1, a second motor controller 30 for controlling the operation of the second motor 2, a gear shifting controller 40 for controlling the engaging ring of the synchronizer 7 to be selectively moved axially to engage with drive gearwheel 6 or 8 to input the power of the second motor 2 and to perform gear shifting; a power system controller 50 for determining expected working points of the two motors so that the first motor controller 20, the second motor controller 30 and the gear shifting controller 40 perform corresponding control operations; a vehicle controller 100 for controlling the power system controller 50 to coordinately control the two motors and other vehicle functionalities. The power system controller 50 may be an individual controller which is connected to and in communication with the vehicle controller 100; alternatively, the power system controller 50 may be a module in the vehicle controller 100 which is connected to and in communication with other modules. According to the illustrated technical solution, the power system controller 50 directly controls the gear shifting controller 40, and controls the first motor controller 20 and the second motor controller 30 via the vehicle controller 100 by taking over the control right of the vehicle controller 100. As an alternative solution, the power system controller 50 may directly control the first motor controller 20, the second motor controller 30 and the gear shifting controller 40.

In the dual motor power system according to the first and second embodiments, the first motor 1 which is directly connected to the transmission path having the single transmission ratio acts as a main motor which provides driving power continuously during the running of the vehicle, and the second motor 2 acts as an assistant motor which provides assistant or individual driving when the required vehicle torque or power is high or when the first motor 1 has a low efficiency. In the gear upshifting or downshifting action of the second motor 2, the first motor 1 continuously outputs power to prevent power interruption.

In the dual motor power system according to the first and second embodiments, the power system controller 50 performs an ergodic optimization strategy for dual motor control of the disclosure to determine expected working points of the two motors.

The control strategy is affected directly by factors like whether there are limitations to the electric current and power of the vehicle battery and whether the two gears $Gear_{EM2}$ of the second motor are predetermined according to a gear-shifting curve. If it is decided in advance that a gear shifting curve for the second motor 2 is determined based on the vehicle speed and the vehicle acceleration pedal depth or other parameters, then the gear $Gear_{EM2}$ of the second motor 2 is determined under a certain vehicle speed, vehicle acceleration pedal depth, etc., as in the prior art. In this condition, there are only two parameters to be optimized, the torque $Trq_{EM1}$ of the first motor 1 and the torque $Trq_{EM2}$ of the second motor 2, so the calculation amount of control strategy algorithm is small, but the optimal efficiency of the whole power system cannot obtained under current operation state since the gear of the transmission is not involved in the optimization procedure.

On the other hand, the gear $Gear_{EM2}$ of the second motor 2 is not predetermined, and acts as an optimization parameter in the optimization procedure according to the disclosure. Thus, the optimal gear for the transmission path of the second motor 2 under current operation state is searched out by ergodic optimization. By comparison with the above described solution of the prior art (first solution), in the solution of the disclosure (second solution), there are three parameters to be optimized, the torque $Trq_{EM1}$ of the first motor 1, the torque $Trq_{EM2}$ of the second motor 2 and the gear $Gear_{EM2}$ of the second motor 2, so the calculation amount of the control strategy algorithm is larger and calculation time is longer, but all the main variable parameters of the power system are involved in the optimization, so the whole power system under the corresponding operation state can be optimized and thus the optimal system efficiency can be obtained. The control strategy is performed in the power system controller 50 of the disclosure in the condition that the gear $Gear_{EM2}$ of the second motor 2 is not determined in advance.

In the power system controller 50 of the disclosure, optimal working points of the first motor 1 and the second motor 2 are ergodically searched. The optimal working point of each motor comprises two components, velocity and torque.

First, the required torque $Trq_{EM2}$ of the second motor 2 is determined based on the torque $Trq_{EM1}$ of the first motor 1, as described below.

The corresponding torque at wheel $Trq_{EM1atwheel}$ of the first motor 1 can be calculated based on the torque $Trq_{EM1}$ of the first motor 1 and the transmission ratio $GR_{EM1}$ of the first motor 1 as well as the transmission path efficiency $Effi_{EM1GB}$ ($Spd_{EM1}$, $Trq_{EM1}$) of the first motor 1 which is a function of the speed $Spd_{EM1}$ and the torque $Trq_{EM1}$ of the first motor 1:

$$Trq_{EM1atwheel} = Trq_{EM1} \times GR_{EM1} \times Effi_{EM1GB}(Spd_{EM1}, Trq_{EM1}) \quad (1)$$

The corresponding required torque at wheel $Trq_{EM2atwheel}$ of the second motor 2 can be obtained by subtracting the torque at wheel $Trq_{EM1atwheel}$ of the first motor 1 from the required torque of vehicle at wheel $Trq_{vehreqatwheel}$:

$$Trq_{EM2atwheel} = Trq_{vehreqatwheel} - Trq_{EM1atwheel} \quad (2)$$

The gear $Gear_{EM2}$ of the second motor 2 may be the first gear or the second gear, so the corresponding torque $Trq_{EM2}$ of the second motor 2 in the first gear or the second gear can be obtained on the basis of the first gear transmission ratio $GR1_{EM2}$ or the second gear transmission ratio $GR2_{EM2}$ of the second motor 2 as well as the transmission path efficiency $Effi_{EM2GB}$ ($Spd_{EM2}$, $Trq_{EM2atwheel}$) of the second motor 2 which is a function of the speed $Spd_{EM2}$ of the second motor 2 and the required torque at wheel $Trq_{EM2atwheel}$ of the second motor 2:

$$Trq_{EM2} = Trq_{EM2atwheel}/GR1_{EM2}/Effi_{EM2GB}(Spd_{EM2}, Trq_{EM2atwheel}) \quad (3)$$

$$Trq_{EM2} = Trq_{EM2atwheel}/GR2_{EM2}/Effi_{EM2GB}(Spd_{EM2}, Trq_{EM2atwheel}) \quad (4)$$

After the relation between the required torque $Trq_{EM2}$ of the second motor 2 and the torque $Trq_{EM1}$ of the first motor 1 has been set as described, the control strategy of the disclosure searches optimal working points of the first motor 1 and the second motor 2 [$Spd_{EM1opt}$, $Trq_{EM1opt}$], [$Spd_{EM2opt}$, $Trq_{EM2opt}$]. In this procedure, all possible torques $Trq_{EM1}$ in the workable range of the first motor 1 are ergodically inspected with a certain torque step, and the corresponding torque requirement of the second motor 2 is obtained by calculation. The motor driving peak torque and the electricity generation peak torque of the first motor 1 under a certain motor speed, which are functions of motor speed, are set respectively as upper and lower torque thresholds in the working state of the first motor 1.

As an alternative embodiment, the required torque $Trq_{EM1}$ of the first motor 1 may be determined first based on the torque $Trq_{EM2}$ of the second motor 2, as described below.

The transmission path of the second motor 2 may be set at the first gear or the second gear, so the torque at wheel $Trq_{EM2atwheel}$ of the second motor 2 in the first gear or the second gear can be calculated based on the torque $Trq_{EM2}$ of the second motor 2 and the transmission ratio $GR1_{EM2}$ or $GR2_{EM2}$ of the second motor 2 in the first gear or the second gear as well as the transmission path efficiency $Effi_{EM2GB}$ ($Spd_{EM2}$, $Trq_{EM2}$) of the second motor 2 which is a function of the speed $Spd_{EM2}$ and the torque $Trq_{EM2}$ of the second motor 2:

$$Trq_{EM2atwheel} = Trq_{EM2} \times GR1_{EM2} \times Effi_{EM2GB}(Spd_{EM2}, Trq_{EM2}) \quad (5)$$

$$Trq_{EM2atwheel} = Trq_{EM2} \lambda GR2_{EM2} \times Effi_{EM2GB}(Spd_{EM2}, Trq_{EM2}) \quad (6)$$

The corresponding torque at wheel $Trq_{EM1atwheel}$ of the first motor 1 can be obtained by subtracting the torque at wheel $Trq_{EM2atwheel}$ of the second motor 2 from the required torque of vehicle at wheel $Trq_{vehreqatwheel}$:

$$Trq_{EM1atwheel} = Trq_{vehreqatwheel} - Trq_{EM2atwheel} \quad (7)$$

On the basis of the combination of the transmission ratio $GR_{EM1}$ of the transmission path of the first motor 1 and the transmission path efficiency $Effi_{EM1GB}$ ($Spd_{EM1Gear}$, $Trq_{EM1atwheel}$) of the transmission for first motor 1, which is a function of the speed $Spd_{EM1}$ of the first motor 1 and the torque at wheel $Trq_{EM1atwheel}$ of the first motor 1, the corresponding required torque $Trq_{EM1}$ of the first motor 1 can be obtained:

$$Trq_{EM1} = Trq_{EM1atwheel}/GR_{EM1}/Effi_{EM1GB}(Spd_{EM1}, Trq_{EM1atwheel}) \quad (8)$$

After the relation between the required torque $Trq_{EM1}$ of the first motor 1 and the torque $Trq_{EM2}$ of the second motor 2 has been set as described, the control strategy of the disclosure ergodically inspects all the possible torque $Trq_{EM2}$ in the possible working range of the second motor 2 with a certain torque step, and obtains the corresponding torque requirement of the first motor 1 by calculation. The motor driving peak torque and the electricity generation peak torque of the second motor 2 under a certain motor speed, which are functions of motor speed, are set respectively as upper and lower torque thresholds in the working state of the second motor 2.

The corresponding synchronized efficiency of the power system can be calculated based on the values of the speed and torque [$Spd_{EM1}$, $Trq_{EM1}$], [$Spd_{EM2}$, $Trq_{EM2}$] of the working points of the first motor 1 and the second motor 2. By comparing various working points of the first motor 1 and the second motor 2 and then selecting the optimal working points of the first motor 1 and the second motor 2 at which the power system can obtain an optimal synchronized efficiency, optimal working points [$Spd_{EM1opt}$, $Trq_{EM1opt}$], [$Spd_{EM2opt}$, $Trq_{EM2opt}$] of the first motor 1 and the second motor 2 are set.

In the control strategy described above, when there are limitations on the battery current and power, priority is given to maintaining battery performance and ensuring battery lifetime in the control strategy of the disclosure in order to set a limitation to the optimization of the economics in the vehicle control strategy.

In this way, according to the above control strategy or method provided by the disclosure, by ergodically searching possible working points of the first motor 1 and the second motor 2 under a certain operation state of a running vehicle, the working points of the first motor 1 and the second motor 2 and the gear $Gear_{EM2}$ of the second motor 2 with highest synchronized efficiency for the power system comprising two motors (the first motor 1 and the second motor 2) can be searched out, while meeting the vehicle running requirements and capacity limitations of components of the power system. Thus, the vehicle economics is improved.

The power system control strategy or method for motor driven pure electric vehicle of the disclosure can be carried out in various manners.

By way of example, the optimal working points of the first motor 1 and the second motor 2 are searched out by ergodically inspecting the torque of the first motor 1. In the searching calculation according to ergodic algorithm, the torque step for ergodic search is set first to ensure high calculation speed of the algorithm while the calculation precision is also guaranteed. In the process of ergodically searching the optimal working points [$Spd_{EM1opt}$, $Trq_{EM1opt}$], [$Spd_{EM2opt}$, $Trq_{EM2opt}$] of the first motor 1 and the second motor 2, the gear $Gear_{EM2}$ of the second motor 2 may be the first gear or the second gear. When the torque of the first motor 1 is ergodically inspecting in an allowed range first, the process may be started from the motor driving peak torque $Trq_{EM1pmot}$ ($Spd_{EM1}$) of the first motor 1 which is a function of the motor speed, and the inspected torque is reduced gradually with a predetermined ergodically inspecting torque step, until the inspected torque is smaller than the electricity generation peak torque $Trq_{EM1pgen}$ ($Spd_{EM1}$) of the first motor 1 which is a function of the motor speed. Alternatively, the process may be started from the electricity generation peak torque $Trq_{EM1pgen}$ ($Spd_{EM1}$) of the first motor 1 which is a function of the motor speed, and the inspected torque is increased gradually with a predetermined ergodically inspecting torque step, until the inspected torque is larger than the motor driving peak torque $Trq_{EM1pmot}$ ($Spd_{EM1}$) of the first motor 1 which is a function of the motor speed. Now a possible process (algorithm) for the control strategy or method of the disclosure for searching the optimal working points with the motor driving peak torque of the first motor 1 as a starting point will be described with reference to FIG. 3 as an example.

Figure 3:
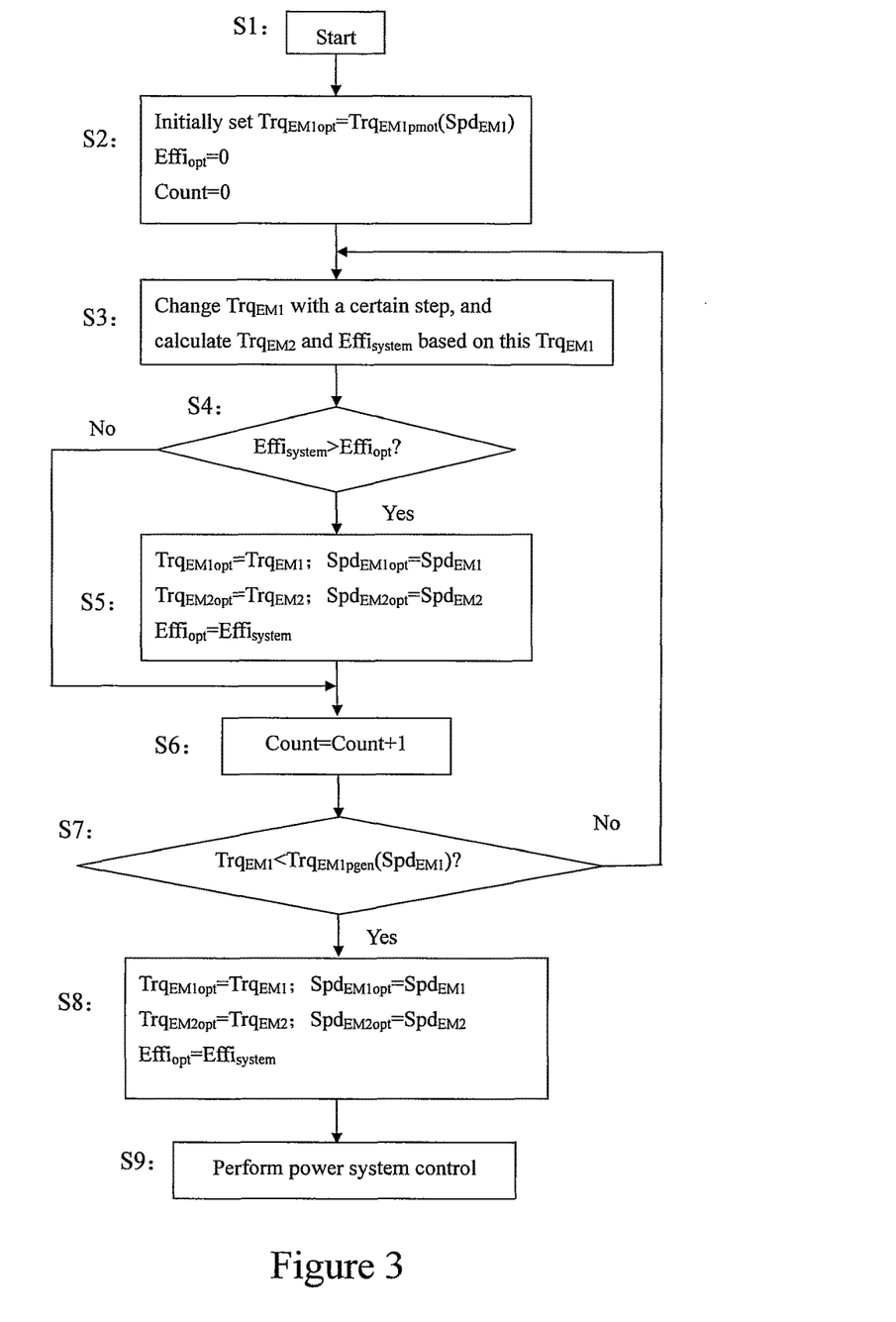
FIG. 3 is a flow chart of a procedure for determining an optimal working point of a dual motor power system according to the disclosure.

First, in Step S1, the process is started.

Then, in Step S2, the initial value of the optimal torque $Trq_{EM1opt}$ of the first motor 1 at current speed $Spd_{EM1}$ is set to be equal to the motor driving peak torque $Trq_{EM1pmot}$ ($Spd_{EM1}$) of the first motor 1. In addition, the value of the optimal power system efficiency $Effi_{opt}$ and the serial number of the working point under search Count are both set to be zero.

Then, in Step S3, the torque $Trq_{EM1}$ of the first motor 1 is changed with a predetermined torque step Step, and the synchronized power system efficiency $Effi_{system}$ is calculated based on this $Trq_{EM1}$.

Specifically, the torque of the first motor 1 is changed first in a manner of:

$$Trq_{EM1}=Trq_{EM1pmot}(Spd_{EM1})-Count\times Step \quad (9)$$

Then, the speed $Spd_{EM1}$ of the first motor 1 is calculated based on current vehicle speed Velocity, the transmission ratio $GR_{EM1}$ of the first motor 1 and the radius of the wheel Rtire:

$$Spd_{EM1}\text{Velocity}\times GR_{EM1}/\text{Rtire} \quad (10)$$

The corresponding torque at wheel $Trq_{EM1atwheel}$ of the first motor 1 is calculated based on the torque $Trq_{EM1}$ obtained in the ergodic manner described above and the transmission ratio $GR_{EM1}$ of the first motor 1 as well as the transmission path efficiency $Effi_{EM1GB}$ ($Spd_{EM1}$, $Trq_{EM1}$) of the transmission for the first motor 1 which is a function of the speed $Spd_{EM1}$ and the torque $Trq_{EM1}$ of the first motor 1 at current vehicle speed Velocity:

$$Trq_{EM1atwheel}=Trq_{EM1}\times GR_{EM1}\times Effi_{EM1GB}(Spd_{EM1}, Trq_{EM1}) \quad (11)$$

The corresponding torque at wheel $Trq_{EM2atwheel}$ of the second motor 2 is obtained by subtracting the torque $Trq_{EM1atwheel}$ from the required torque of vehicle at wheel $Trq_{vehreqatwheel}$:

$$Trq_{EM2atwheel}=Trq_{vehreqatwheel}-Trq_{EM1atwheel} \quad (12)$$

According to current vehicle speed Velocity, the transmission ratio $GR_{EM2}$ of the second motor 2 and the radius of the wheel Rtire, the speed $Spd_{EM1}$ of the first motor 1 in the first gear or the second gear is calculated out:

$$Spd_{EM2}\text{Velocity}\times GR1_{EM2}/\text{Rtire} \quad (13)$$

$$Spd_{EM2}\text{Velocity}\times GR2_{EM2}/\text{Rtire} \quad (14)$$

Using the first or second gear transmission ratio $GR1_{EM2}$ or $GR2_{EM2}$ of the second motor 2 as well as the transmission path efficiency $Effi_{EM2GB}$ ($Spd_{EM2}$, $Trq_{EM2atwheel}$) of the second motor 2 which is a function of the speed $Spd_{EM2}$ of the second motor 2 and the torque at wheel $Trq_{EM2atwheel}$ of the second motor 2, the corresponding torque $Trq_{EM2}$ of the second motor 2 in the first gear or the second gear is obtained:

$$Trq_{EM2}=Trq_{EM2atwheel}/GR1_{EM2}/Effi_{EM2GB}(Spd_{EM2}, Trq_{EM2atwheel}) \quad (15)$$

$$Trq_{EM2}=Trq_{EM2atwheel}/GR2_{EM2}/Effi_{EM2GB}(Spd_{EM2}, Trq_{EM2atwheel}) \quad (16)$$

A working point is determined as not meeting the requirements or being not proper if the value of $Spd_{EM2}$ or $Trq_{EM2}$ extends beyond a limited scope.

In the ergodic search process, for the working points of the first motor 1 and the second motor 2 which are expressed as [$Spd_{EM1}$, $Trq_{EM1}$] and [$Spd_{EM2}$, $Trq_{EM2}$], the synchronized power system efficiency $Effi_{system}$ is defined as a ratio of the output power of the power system $Pwr_{output}$ to the input power of the power system $Pwr_{input}$:

$$Effi_{system}=Pwr_{output}/Pwr_{input} \quad (17)$$

The mechanical power $PwrM_{EM1}$ and $PwrM_{EM2}$ of the first motor 1 and the second motor 2 are calculated respectively by:

$$PwrM_{EM1}=Trq_{EM1}\times Spd_{EM1} \quad (18)$$

$$PwrM_{EM2}Trq_{EM2}\times Spd_{EM2} \quad (19)$$

When the first motor 1 is used for electrically driving, the electric power $PwrE_{EM1mot}$ of the first motor 1 equals to the mechanical power divided by the motor electric driving efficiency $\text{Effi}_{EM1mot}$ of the first motor 1 which is a function of motor speed and torque:

$$PwrE_{EM1mot} = PwrM_{EM1}/\text{Effi}_{EM1mot}(Spd_{EM1}, Trq_{EM1}) \quad (20)$$

When the first motor 1 is used for generating electricity, the electric power $PwrE_{EM1gen}$ of the first motor 1 equals to the mechanical power multiplied by the motor electricity generation efficiency $\text{Effi}_{EM1gen}$ of the first motor 1 which is a function of motor speed and torque:

$$PwrE_{EM1gen} = PwrM_{EM1} \times \text{Effi}_{EM1gen}(Spd_{EM1}, Trq_{EM1}) \quad (21)$$

When the second motor 2 is used for electrically driving, the electric power $PwrE_{EM2mot}$ of the second motor 2 equals to the mechanical power divided by the motor electric driving efficiency $\text{Effi}_{EM2mot}$ of the second motor 2 which is a function of motor speed and torque:

$$PwrE_{EM2mot} = PwrM_{EM2}/\text{Effi}_{EM2mot}(Spd_{EM2}, Trq_{EM2}) \quad (22)$$

When the second motor 2 is used for generating electricity, the electric power $PwrE_{EM2gen}$ of the second motor 2 equals to the mechanical power multiplied by the motor electricity generation efficiency $\text{Effi}_{EM2gen}$ of the second motor 2 which is a function of motor speed and torque:

$$PwrE_{EM2gen} = PwrM_{EM2} \times \text{Effi}_{EM2gen}(Spd_{EM2}, Trq_{EM2}) \quad (23)$$

When the first motor 1 and the second motor 2 are both used for electrically driving:

$$Pwr_{input} = PwrE_{EM1mot} + PwrE_{EM2mot} \text{ and } Pwr_{output} = PwrM_{EM1} + PwrM_{EM2} \quad (24)$$

When the first motor 1 and the second motor 2 are both used for generating electricity:

$$Pwr_{input} = PwrM_{EM1} + PwrM_{EM2} \text{ and}$$
$$Pwr_{output} = PwrE_{EM1gen} + PwrE_{EM2gen} \quad (25)$$

When the first motor 1 is used for electrically driving and the second motor 2 is used for generating electricity:

$$Pwr_{input} = PwrE_{EM1mot} + PwrM_{EM2} \text{ and}$$
$$Pwr_{output} = PwrM_{EM1} + PwrE_{EM2gen} \quad (26)$$

When the first motor 1 is used for generating electricity and the second motor 2 is used for electrically driving:

$$Pwr_{input} = PwrM_{EM1} + PwrE_{EM2mot} \text{ and}$$
$$Pwr_{output} = PwrE_{EM1gen} + PwrM_{EM2} \quad (27)$$

In the configuration of the power system shown in FIGS. 1 and 2, when the power of the first motor 1 is zero and the power of the second motor 2 is not zero, the second motor 2 will drag the first motor 1 to rotate since the first motor 1 is directly coupled with the transmission, and thus the additional loss caused by dragging the first motor 1 should be considered in the calculation process.

Then, in Step S4, it judges whether the synchronized power system efficiency $\text{Effi}_{system}$ calculated out in Step S3 is higher than the value of the optimal power system efficiency $\text{Effi}_{opt}$; if the result of judge is "Yes", the process goes to the next step, Step S5, and if the result of judge is "No", then the process goes to Step S6.

Then, in Step S5, the former optimal working points $[Spd_{EM1opt}, Trq_{EM1opt}]$, $[SPd_{EM2opt}, Trq_{EM2opt}]$ of the first motor 1 and the second motor 2 and the former optimal system efficiency $\text{Effi}_{opt}$ are substituted by the current working points $[Spd_{EM1}, Trq_{EM1}]$, $[Spd_{EM2}, Trq_{EM2}]$ of the first motor 1 and of the second motor 2 and the current synchronized system efficiency $\text{Effi}_{system}$.

Then, in Step S6, the serial number of the working point under search is added by one.

Then, in Step S7, it judges whether the current torque $Trq_{EM1}$ of the first motor 1 is smaller than the electricity generation peak torque $Trq_{EM1pgen}$ of the first motor 1; if the result of judge is "Yes", the process goes to the next step, Step S8, and if the result of judge is "No", then the process returns back to Step S3.

Then, in Step S8, the current values of $Trq_{EM1opt}$, $Spd_{EM1opt}$, $Trq_{EM2opt}$, $Spd_{EM2opt}$, $\text{Effi}_{opt}$ are fixed, and the working points $[Spd_{EM1opt}, Trq_{EM1opt}]$, $[Spd_{EM2opt}, Trq_{EM2opt}]$ with optimal power system efficiency are obtained.

Then, in Step S9, the power system performs corresponding operation based on the optimal working points of the two motors determined above.

For the embodiments of the power system described with reference to FIGS. 1 and 2, the power system controller 50 is configured for performing the above process to determine the optimal working points of the first motor 1 and the second motor 2 so that torque distribution between the two motors is optimized. Then the power system controller 50 sends out corresponding instructions to the first motor controller 20, the second motor controller 30 and the gear shifting controller 40 to maintain the synchronizer 7 in a desired position or shift it to the desired position, and the first motor 1 and the second motor 2 output optimal torques.

It should be noted that, in the condition that there are limitations to the vehicle battery current and power, the combined input electric current and power of the first motor 1 and the second motor 2 corresponding to the current values of $Trq_{EM1opt}$, $Spd_{EM1opt}$, $Trq_{EM2opt}$, $Spd_{EM2opt}$, $\text{Effi}_{opt}$ can be checked between Steps S5 and S6 of the above process; if the combined input electric current and power of the two motors falls beyond (higher or lower than) the limited vehicle battery current and power, the values of $Trq_{EM1opt}$, $Spd_{EM1opt}$, $Trq_{EM2opt}$, $SPd_{EM2opt}$, $\text{Effi}_{opt}$ are set to be the former set of values of them, and the process goes to Step S9; an if the combined input electric current and power does not fall beyond the limited vehicle battery current and power, then the process goes to Step S7. Of course, the above step described in this paragraph is applicable in the condition where the vehicle battery current and power are not subjected to severe limitations. In the condition that the battery current and power are subjected to severe limitations, priority is given to the battery lifetime to maintain the battery performance, and the power system efficiency optimization is considered with less or no priority.

It can be seen that, in the above described process, when all the torque points of the first motor 1 under a certain operation state of the vehicle have been inspected ergodically, the working points $[Spd_{EM1opt}, Trq_{EM1opt}]$, $[Spd_{EM2opt}, Trq_{EM2opt}]$ for optimal power system efficiency can be obtained by comparing the synchronized power system efficiencies at all the working points. Thus, the system efficiency is optimized.

After reading the process shown in FIG. 3 and described above, those skilled in the art can design a process for searching the optimal working points conveniently using the electricity generation peak torque of the first motor 1 as a starting point.

The calculation speed and precision of the optimizing process of the disclosure can be improved in various ways. For example, the torque step may be designed to be variable or adjustable. By way of example, in the condition that the calculated system efficiency is higher than the former system efficiency, the absolute value of the torque step can be decreased to increase the calculation precision. In the condition that the currently calculated system efficiency is lower than the former system efficiency, the absolute value of the torque step is increased to increase the calculation speed; then, if the currently calculated system efficiency with the increased torque step is higher than the former system efficiency, then the process goes back to a working point between the former one and the current one to conduct calculation again. In addition, it can be contemplated that, when the current increment of the system efficiency is larger than the increment of the former system efficiency, the absolute value of the torque step can be increased to increase the calculation speed; and when the current increment of the system efficiency is smaller than the increment of the former system efficiency, the absolute value of the torque step can be decreased to increase the calculation precision. Of course, any concrete algorithm, in which calculation speed and calculation precision are coordinately considered, can also be constructed.

Further, when it is desired to increase the control speed, an offline interpolation table can be calculated out using the method of the disclosure, and in the running of the vehicle, torque distribution between the two motors can be set by checking the offline interpolation table. Of course, in this embodiment, it is not easy to calculate the motor efficiency and the vehicle system efficiency following the voltage of the vehicle battery which may be changed in real operation.

It can be understood that the control system and control method for the power system of a pure electric vehicle driven by dual motors of the disclosure are not limited to the above described details, especially the concrete process and algorithm described with reference to FIG. 3; rather, any suitable ergodic optimization method and its concrete process and algorithm can be used within the spirit of the disclosure.

According to the control system and control method provided in the disclosure, by conducting ergodic optimization to possible working points of two motors under a certain operation state during the running of the vehicle, working points of the two motors and the gear ratio of the second motor corresponding to the highest synchronized power system efficiency can be searched out under the premise of meeting the running requirement of the vehicle and the limitations on the components of the power system, so the vehicle economics is improved.

While the disclosure has been described here with reference to certain embodiments, the scope of the disclosure is not limited to the illustrated and described details. Rather, these details can be modified in various manners without departing from the basic concept of the disclosure.

The invention claimed is:

1. A dual motor power system for a pure electric vehicle, comprising:
    first and second motors;
    a transmission coupled with the first and second motors in a manner that the first motor is able to output power with a single gear ratio and the second motor is able to output power with two gear ratios, the transmission comprising a single synchronizer for controlling the two gear ratios of the second motor; and
    a control system configured to determine a torque distribution between the first and second motors and an engaging position of the synchronizer and to control operations of the first and second motors and the synchronizer;
    wherein the control system is configured to determine the torque distribution between the first and second motors and the engaging position of the synchronizer by the steps of:
    (1) a step of establishing a torque distribution relation of the first and second motors, wherein a required torque of vehicle at wheel, required torques of the two motors at wheel, a transmission path efficiency for the two motors and the gear ratio of the second motor are all involved in determining the torque distribution relation;
    (2) a step of establishing a relation between a synchronized efficiency of the power system and working points of the first and second motors, each working point being expressed by a torque and a speed;
    (3) an optimization step in which the following concrete ergodic optimization actions are taken, with the synchronized efficiency of the power system as the optimization objective and with the torque distribution of the first and second motors and the gear ratio of the second motor as parameters to be optimized:
        within a range defined between upper and lower torque thresholds for the operations of one motor of the first and second motors under current vehicle speed, a torque of the one motor of the first and second motors is changed stepwise with a certain torque step;
        a torque of the other motor of the first and second motors is determined based on the torque distribution relation of the first and second motors; and
        the synchronized efficiency of the power system is determined based on the torques of the first and second motors so that an optimal synchronized efficiency of the power system is ergodically searched out, and optimal working points of the first and second motors and a corresponding gear ratio of the second motor are determined.

2. The dual motor power system of claim 1, wherein under a certain torque of the one motor of the first and second motors, a corresponding working point is abandoned if the required torque of the other motor of the first and second motors falls beyond an upper torque threshold of the other motor or a lower torque threshold of the other motor.

3. The dual motor power system of claim 1,
    wherein a motor driving peak torque and an electricity generation peak torque of the first and second motors, which are functions of motor speed, are regarded as the upper and lower torque thresholds, respectively, for the operations of the first and second motors, and
    wherein in the optimization step, the torque of the one motor of the first and second motors is changed stepwise with certain torque step from the motor driving peak torque or the electricity generation peak torque of the one motor of the first and second motors, until the torques of the one motor of the first and second motors reaches the electricity generation peak torque or the motor driving peak torque.

4. The dual motor power system of claim 1,
    wherein the first motor acts as a main motor which provides driving power continuously during a running of the vehicle, and the second motor acts as an assistant motor which provides assistant driving power or individual driving power when a required vehicle driving torque or a required vehicle driving power is high or the first motor has a low efficiency; and
    wherein in the optimization step, the torque of the first motor is changed with a certain torque step within a range of the upper and lower torque thresholds for the operation of the first motor under current vehicle speed for performing the ergodic optimization actions.

5. The dual motor power system of claim 1, wherein when the output power of the first motor is zero, a power loss in the operation of the second motor caused by dragging the first motor to rotate is involved in calculating a synchronized system efficiency.

6. The dual motor power system of claim 1, wherein in the step of establishing the relation between the synchronized efficiency of the power system and the working points of the first and second motors, an electrically driving efficiency of each motor when it is used as an electric motor and an electricity generation efficiency of each motor when it is used as an electricity generator are involved.

7. The dual motor power system of claim 1,
wherein in the optimization step, limitations on an electric current and power of a vehicle battery are involved, and
if a combination of the working points of the first and second motors results in the vehicle battery current or power falling beyond the limitations, the combination of working points are abandoned.

8. The dual motor power system of claim 7, wherein if the combination of the working points of the first and second motors results in the vehicle battery current or power falling beyond the limitations, the first and second motors are set to prior working points of the first and second motors.

9. The dual motor power system of claim 1, wherein in the optimization step, the torque step is adjusted to increase a calculation speed and/or a calculation precision.

10. The dual motor power system of claim 1, wherein the step of establishing the relation between the synchronized efficiency of the power system and the working points of the first and second motors comprises calculating and storing previously an offline interpolation table, by means of which, the optimal working points of the first and second motors and the corresponding gear ratio of the second motor are determined in the optimization step.

11. A control method used in a dual motor power system for a pure electric vehicle, wherein the dual motor power system includes (1) a first motor able to output power with a single gear ratio and a second motor able to output power with two gear ratios, (2) a transmission coupled with the first and second motors and having a single synchronizer for controlling the two gear ratios of the second motor, and (3) a control system to perform the control method comprising the steps of:
(1) a step of establishing a torque distribution relation of the first and second motors, wherein a required torque of vehicle at wheel, required torques of the two motors at wheel, a transmission path efficiency for the two motors and a gear ratio of the second motor are all involved in determining the torque distribution relation;
(2) a step of establishing a relation between a synchronized efficiency of the power system and working points of the first and second motors, each working point being expressed by a torque and a speed;
(3) an optimization step in which the following concrete ergodic optimization actions are taken, with the synchronized efficiency of the power system as the optimization objective and with the torque distribution of the first and second motors and the gear ratio of the second motor as parameters to be optimized:
within a range defined between upper and lower torque thresholds for operations of one motor of the first and second motors under current vehicle speed, a torque of the one motor of the first and second motors is changed stepwise with a certain torque step;
a torque of the other motor of the first and second motors is determined based on the torque distribution relation of the first and second motors; and
the synchronized efficiency of the power system is determined based on the torques of the first and second motors so that an optimal synchronized efficiency of the power system is ergodically searched out, and optimal working points of the first and second motors and a corresponding gear ratio of the second motor are determined.

12. The control method of claim 11, wherein the optimization step comprises the following sub-steps carried out in sequence:
Step 1, setting a value of a torque of the one motor of the first and second motors to be equal to one of the upper and lower torque thresholds, and setting both the synchronized efficiency of the power system and a serial number of a working point under search to be zero;
Step S2, from the one of the upper and lower torque thresholds, changing the value of the torque of the one motor of the first and second motors with a certain torque step, based on which value, a value of the torque of the other motor of the first and second motors is calculated, and then calculating a current power system efficiency based on the values of the torques of the first and second motors;
Step S3, judging whether the calculated current power system efficiency is higher than a former power system efficiency and going to Step S4 if a result of Step S3 is "Yes" or going to Step S5 if the result of Step S3 is "No";
Step S4, updating the working points of the first and second motors, the gear ratio of the second motor and the synchronized efficiency of the power system to be their current values;
Step S5, increasing the serial number of the working point under search by one;
Step S6, judging whether the value of the torque of the one motor of the first and second motors reaches the other of the upper and lower torque thresholds and going to Step S7 if the result of Step S6 is "Yes" or going to Step S2 if the result is "No";
Step S7, keeping current values of the working points of the first and second motors, the gear of the second motor and the synchronized efficiency of the power system; and
Step S8, performing real-time control to the first and second motors and the synchronizer based on the current values of the working points of the first and second motors, the gear of the second motor and the synchronized efficiency of the power system.

* * * * *